3,260,705
PROCESS FOR POLYMERIZING VINYL CHLORIDE
AND A FUMARATE ESTER
Robert J. Slocombe, Kirkwood, and Robert Z. Greenley, St. Louis, Mo., assignors to Monsanto Company, a corporation of Delaware
No Drawing. Filed May 13, 1963, Ser. No. 280,148
12 Claims. (Cl. 260—78.5)

The present invention relates to the use of bases, especially amines in the interpolymerization of vinyl chloride with hydroxyalkyl fumarates.

In the simultaneously filed copending applications of Robert J. Slocombe, S.N. 280,069 and S.N. 280,147, certain vinyl chloride/hydroxy alkyl fumarate copolymers and vinyl chloride/fumarate/isobutylene interpolymers and their preparation have been disclosed and claimed. The present invention involves the use of bases such as organic amines in the preparation of the aforesaid polymers for the purpose of improving certain properties of the polymers.

The preparation of the polymers of interest occurs under moderate free radical polymerization conditions but organic amines are employed for the purpose of counteracting the free carboxylic acids ordinarily present to some extent in fumaric acid esters. The free carboxyl groups are undesirable with respect to certain polymer properties.

According to the present invention, a base, particularly an organic amine, is employed to prevent fumaric compound containing free carboxyl from taking part in the polymerization. Apparently the amines form cations with monoesters of fumaric acid, thereby preventing them from taking part in the polymerization. Any amount of amine will have some effect in this regard but to really achieve the desired results, it is necessary to gauge the amount of amine according to the acidity in the fumarate monomer and to employ an amount of amine at least approximately stoichiometrically equivalent to the acid. The stoichiometric amount should not be greatly exceeded for optimum results, although larger amounts can be employed. Ordinarily the amount of amine will be approximately 1 to 1.5 moles per equivalent of acid in the monomer, or ordinarily, per mole of monoalkyl fumarate. It will be understood that there will be some variation in amounts with the degrees of dissociation to be encountered with various amines and different solvent to monomer ratios, but the amount of amine will be that required to effectively neutralize the acid. A large excess is undesirable as it tends to cause splitting out of HCl and generation of color. Moreover amines cause inhibition of free radical catalyzed polymerization, particularly of peroxide catalyzed polymerization, and in the present polymerizations the rate of inhibition based on amine quantity increases markedly as the amount of amine exceeds the stoichiometric. Conversely, amounts much less than stoichiometric do not prevent the fumaric acid monoester polyerization to the desired degree.

The interpolymers prepared by the present process are of especial interest when the acidity, calculated as monoethyl fumarate, is no greater than 2% by weight, preferably no greater than 1.5% by weight. Such low acid interpolymers will have acidity such that no more than 0.14 milliequivalent base/gram of polymer is necessary for neutralization, and preferably no more than 0.105 milliequivalent base/gram of polymer.

It is advantageous to avoid free carboxyl groups in the polymers for a number of reasons. The carboxyl groups cause color formation and often result in the polymer having a yellow color even as isolated from the polymerization. In addition, the carboxyl groups tend to cause crosslinking which leads to insolubility, which is decidedly disadvantageous if the polymers are to be employed in solution for coating purposes.

The amount of free acid in the fumarate monomer employed can be fairly substantial in view of the effectiveness of the amines in counteracting it. However, it will still be desirable to avoid undue acidity. Crude hydroxyethyl ethyl fumarate ordinarily contains about 6% by weight of monoethyl fumarate. This can be reduced to about 3% by weight by vacuum distillation and to less than 1% by weight by converting the monoethyl fumarate to its alkali salt or similar procedures. It is desirable that the hydroxy fumarates employed in the present invention contain amounts less than 5%, for example less than 2% and preferably less than 1% by weight of fumarate monoester. For example, monomer requiring less than about 0.14 milliequivalent base/gram for neutralization or more preferably less than about 0.105 milliequivalent base/gram is suitable.

The present invention is particularly concerned with an improvement in the polymerization of vinyl chloride and diesters of fumaric acid represented by the formula:

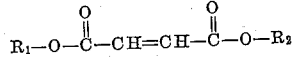

in which $R_1$ is alkyl, including cycloalkyl or alkaryl, aryl, etc., and $R_2$ is

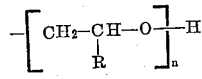

or

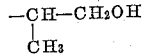

where $n$ is a number of average value from 1 to 8 and R is hydrogen or methyl, e.g., $R_2$ can be 2-hydroxy-n-propyl, hydroxyethoxyethyl, etc., and various hydroxyethoxy or hydroxypropoxy groups. While the foregoing hydroxy alkyl groups are preferred from the standpoint of methods of preparation of the fumarates and the properties of the resulting interpolymers, other hydroxyalkyl groups can be utilized, e.g., 3-hydroxypropyl, 4-hydoxy-butyl, hydroxyhexyls, etc., the various 2-hydroxyalkyls being preferred. It is preferred that $n$ in the above formula be 1 and it is also preferred that R be hydrogen, and especially preferred that $R_2$ be 2-hydroxyethyl. It is preferred that $R_1$ be an alkyl of no more than 10 carbons, e.g., methyl, ethyl, propyl, butyl, isobutyl, t-butyl, pentyl, n-hexyl, isohexyl, octyl, decyl, etc. It will be understood that the fumarate esters employed have the trans structure characteristic of fumaric acid and its esters.

The hydroxy-bearing radicals suitable as esterifying groups on the fumarate can conveniently be termed hydroxy (oxa) hydrocarbyl radicals, it being understood that oxygen atoms can interrupt the hydrocarbon units and be present in an alkylene or polyalkylene ether chain, or can be absent leaving a strictly hydrocarbon group between the hydroxy group and the oxygen of the

group to which the hydrocarbyl radical is attached. Further specific examples of hydroxyalkyl fumarates suitable for use in the present invention include butyl hydroxyethyl fumarate, phenyl hydroxyethyl fumarate, propyl hydroxyethyl fumarate, hexyl hydroxyethyl fumarate, cyclohexyl hydroxyethyl fumarate, benzyl hydroxyethyl fumarate, ethyl 3-hydroxypropyl fumarate, butyl 3-hydroxypropyl fumarate, butyl 2-hydroxypropyl fumarate, butyl 2-hydroxybutyl fumarate, butyl 4-hydroxybutyl fumarate, etc. It will be understood that the $R_2$ groups can be substituted for $R_1$, or a monomer with two $R_2$ groups can be used in admixture with a monomer containing two $R_1$ groups, although it is preferred to use monomer of the illustrated structure.

The present invention also applies to polymerizations in which isobutylene is included along with the other monomers to aid in achieving desired molecular weights and to contribute to the stability of the resulting polymer.

The monomers can be employed in widely varying proportions, e.g., 1 to 99 parts vinyl chloride per 100 parts monomer, but will ordinarily be regulated to give the desired proportion in the polymer for particular polymer properties. The relationship of the vinyl chloride to fumarate esters can be suitably treated on a weight basis, the vinyl chloride constituting for example from less than about 35% to more than about 95% by weight of these types monomers in the polymer; while the amount of isobutylene, if present, can be considered on a mole basis with respect to the fumarate, e.g., from about 0.5 to 3 or more moles isobutylene, if present, being present per mole of fumarate, and the moles of isobutylene, if present, preferably being in excess of the fumarate, e.g., from more than 1 to 2 moles isobutylene per mole of fumarate. Broadly applicable proportions in the polymer are, for example, 45 to 90% vinyl chloride, 8 to 53% fumarate, and 2 to 20% isobutylene, the percentages being by weight. Particularly suitable fumarates for use in the present invention are those in which $R_1$ in the above formula is an alkyl group of 1 to 10 carbon atoms, and $R_2$ is beta-hydroxyethyl. Generally the amount of vinyl chloride will be within a lower, more limited range, e.g., about 50 to 90% by weight of the vinyl chloride and fumarate content, with the isobutylene, if present, in the foregoing ranges with respect to the fumarate. When the interpolymer is to be employed as a modified polyvinyl chloride in a surface coating solution, the vinyl chloride content is ordinarily fairly high, for example about 70% to 90% by weight of the total vinyl chloride and fumarate content, with the isobutylene, if present, based on the fumarate content as above, for example, 0.5 to 2 moles isobutylene, if present, per mole of fumarate. The optimum proportions may vary somewhat with the particular fumarate employed, but the foregoing ranges are generally applicable. In particular, the foregoing ranges can suitably be employed when ethyl hydroxyethyl fumarate is the fumarate monomer employed. A particularly suitable and more narrowly defined polymer contains 70 to 78% by weight vinyl chloride, 12 to 22% ethyl hydroxyethyl fumarate and 5 to 11% isobutylene, if present.

In conducting the polymerization process of the present invention, the monomers are employed in the concentrations needed to obtain the desired monomer ratios in the polymer product. As the fumarates enter the copolymer at a fast rate, they can be charged to the polymerization in relatively small amounts, e.g., from fractions of 1% to about 5% by weight of the monomer charge. For example, it would seldom be necessary to exceed 20% by weight of the monomer charge to obtain very high percentages of the fumarate in the polymer, and ordinarily the amount of fumarate charged would be less than 10% by weight, and usually less than about 5% by weight. Of course, it is necessary to replenish the fumarate as used when the polymerization is carried to high conversion if the total fumarate content is to be much higher than that initially charged. It is not necessary to maintain a precisely constant monomer ratio, but the fumarate should be present in substantial amounts at all times if relatively uniform copolymer is to be obtained, and the foregoing percentage amounts can be considered as approximately the maximum amounts to be present during a polymerization to obtain the indicated results. The amounts of isobutylene if present in the polymerization mixture will generally be greater on a molar basis than the amounts of fumarate, for the isobutylene, tends to enter the copolymer at a slower rate. For example, from 2 to 20 or more moles isobutylene may be employed per mole of fumarate. A monomer mixture suitable for obtaining an interpolymer for surface coating can contain about 85 to 95 parts by weight vinyl chloride, 1 to 6 parts by weight fumarate and 5 to 10 parts by weight of isobutylene, if present. Such proportions can be employed when the fumarate is ethyl hydroxyethyl fumarate, but the more preferred proportions are about 88 to 92 parts vinyl chloride, about 2 to 3 parts fumarate and 5 to 10 parts isobutylene, if present, all proportions being by weight.

The fumarates employed in the present invention enter the polymer at a faster rate than vinyl chloride. Hence, heterogeneous polymer can be obtained by simply continuing an ordinary batch polymerization to fairly high conversion without adding additional monomer. However, it is generally desirable to obtain a fairly uniform polymer product; this can be done by stopping the polymerization or discharging materials from the reactor at a fairly low conversion, e.g., at a point where substantially all the fumarate has been polymerized. Alternatively, a relatively uniform ratio of unpolymerized monomers by addition of fumarate or vinyl chloride, fumarate and isobutylene, if employed, or by removal of vinyl chloride and isobutylene, if employed, at the proper rate.

The interpolymers can be prepared by the present invention in various molecular weight ranges; however, it is preferred that they have molecular weight ranges of the order of 1000 to 25,000 or more particularly, 1000 to 10,000 (number average molecular weights as determined by vapor phase osmometer). In solution and coating applications the use of relatively low molecular weights, often less than 5000, is important with respect to solubility and viscosity, and it is also significant with respect to obtaining low melt viscosity for laminating applications. For solution applications, copolymer having a viscosity in the range of about U to about X on the Gardner scale measured as a 50% solids solution in a 50:50 weight mixture of methyl isobutyl ketone: toluene is particularly suitable. For solution applications in general, it is desirable that the copolymers be soluble in toluene, xylene or other aromatic hydrocarbon solvents at 50% by weight or higher solids concentrations, and also in ketone solvents, or in mixtures of aromatic and ketone solvents, containing for example up to 50% of methyl isobutyl ketone or 4-methoxy-4-methyl-pentanone-2, in contrast to the very limited solubility of polyvinyl chloride in toluene, xylene or such ketones as methyl ethyl ketone, although lesser concentrations such as 30% or 40% by weight can at times be used.

The process of the present invention is conducted under conditions suitable for free-radical catalyzed polymerization of vinyl compounds. The polymerization is generally conducted at slightly elevated temperatures at atmospheric or autogenous pressures in the presence of peroxide or azo catalysts. Temperatures of the order of 50 to 100° C., are preferred, and it is generally desirable not to exceed temperatures of 140–150° C., because of thermal stability considerations. If desired, low temperature catalysts, e.g., trialkyl boron in combination with oxygen, can be employed to conduct the polymerization at very low temperatures, e.g., −20 or −30° C., or lower, or the polymerization can be effected at room temperatures. The temperature and amount of catalyst can be regulated to control molecular weight of the copolymer, higher temperatures and higher amounts of catalysts causing production of lower molecular weights. The polymerization media also influence molecular weight, polymerization in solution, for example, resulting in lower molecular weight copolymer than obtained in emulsion polymerization. Solution, mass or emulsion polymerization systems can be employed in the present invention. When use of the copolymer as a solution for coating applications is contemplated it will often be desirable to conduct the polymerization in solution. Various hydrocarbon or ketone solvents are suitable as solution media, e.g., xylene, toluene, benzene, acetone, cyclohexanone, n-hexane, kerosene, etc.

The present invention employs bases to react with free carboxyl groups and to prevent fumaric acids from taking part in the polymerization. Various organic amines are suitable for such purpose, such as primary, secondary, tertiary and even quaternary amine or ammonium ions. Tertiary amines, particularly tertiary aliphatic amines, are especially suited for such use, e.g., such trialkyl amines as trimethylamine, tripropylamine, triisopropylamine, tributylamine, triamylamine, trihexylamine, diethylmethylamine, etc., particularly such amines in which the alkyl groups have 1 to 10 carbon atoms. Primary and secondary amines can also be employed, e.g., ethylamine, n-hexylamine, ethylmethylamine, etc. Aromatic amines can also be employed although care should be exercised to avoid any undue inhibition of the polymerization. Various heterocyclic amines, e.g., pyridines, piperidines, morpholines, etc., are also suitable. In general it is preferred that the amine be hydrocarbon in structure aside from the amino nitrogen atom. Tetraalkyl ammonium hydroxides, e.g., tetraethylammonium hydroxide, tetrabutylammonium hydroxide, tetramethylammonium hydroxide, triethylmethylammonium hydroxide, etc., can also be employed.

Various catalysts can be employed in the polymerization of the present invention, for example, inorganic or organic peroxide, azo catalysts and redox catalysts. Azo catalysts such as those illustrated in U.S. Patent Numbers 2,471,959, 2,515,628, 2,520,338, 2,520,339, and 2,565,573 can be employed; to further illustrate, azobisisobutyronitrile, methyl azobisisobutyrate, and diethyl-2,2'-azobis-(2-methyl propionate) are suitable. Peroxy catalysts such as peroxides or carbonates can be employed, e.g., ditertiarybutyl peroxide, benzoyl peroxide, lauroyl peroxide, tert-butyl perbenzoate, etc. Various boron hydride or alkyl boron catalyst can also be employed, e.g., trialkyl boron in combination with oxygen.

The present invention is illustrated by the following examples.

Example 1

A reactor was charged with 54 grams vinyl chloride, 6 grams ethyl hydroxyethyl fumarate and 0.18 gram azobisisobutyronitrile, 10 grams acetone and 0.1% by weight triethylamine based on the ethyl hydroxyethyl fumarate. The trimethylamine was dissolved in the acetone. The mole ratio of triethylamine to monoethyl fumarate present was 1.5/1. The reactants were heated to 60° C., for 2½ hours. The reactor was then emptied into 200 ml. cold methanol and rinsed with 10 ml. acetone. The methanol was then heated to 50° C., with stirring, cooled to −20° C., and decanted from the copolymer. The copolymer was dried in a vacuum oven at 40° C., and did not cross-link while drying. The copolymer exhibited excellent film properties upon curing at 150° C., for 15 minutes on a steel panel, including good hardness and impact strength. Butylated melamine formaldehyde resin, Resimene 882, added in 20% concentration prior to curing was compatible and hastened curing but this amount adversely affected impact strength indicating overcuring. Solutions in 1:1 methyl isobutyl ketone:toluene containing 50% solids were prepared, and both with and without the added resin, gave water-white castings.

A companion run in which the ratio of triethylamine to monoethyl fumarate was 0.14 to 1 cross-linked upon drying and showed insolubilization.

Example 2

Several polymerizations were made using ethyl hydroxyethyl fumarate monomer containing a higher amount of monoethyl fumarate, viz., 4.2%, and employing a 90/10 ratio of vinyl chloride to ethyl hydroxyethyl fumarate with 0.1 mole percent azobisisobutyronitrile at 60° C., and different amounts of triethylamine. The copolymer from a polymerization employing 0.62 mole triethylamine (per mole monoethyl fumarate) cross-linked upon drying, while those from polymerizations employing 1.23 moles and 1.76 moles triethylamine had very good properties.

Example 3

Vinyl chloride and ethyl hydroxyethyl fumarate were provided in a 90/10 weight ratio and copolymerized at 70° C., for 15 minutes in procedures using 15 ml. acetone, 0.18 gram azobisisobutyronitrile, 54 grams vinyl chloride and 6 grams ethyl hydroxyethyl fumarate. The ethyl hydroxyethyl fumarate contained 4.2 weight percent monoethyl fumarate, and triethylamine was present in some runs in the amounts indicated.

| Run | Grams Triethylamine | Conversion | Weight percent Vinyl Chloride | Weight percent Monoethyl Fumarate |
|---|---|---|---|---|
| 1 | 0 | 6.7 | 46.3 | 2.5 |
| 2 | 0.05 | 10.1 | 48.2 | 1.8 |
| 3 | 0.10 | 7.4 | 46.0 | 1.3 |
| 4 | 0.17 | 6.2 | 45.4 | 1.2 |

The product of Run No. 1 containing 2.5% monoethyl fumarate was greenish in color and corrosive to metal substrates, compared to the nearly colorless appearance of the other products, and in addition tended to cross-link and become insoluble at slightly elevated temperatures. The advantage of employing amines to counteract acidity when the fumarate contains relatively high amounts of monoethyl fumarate is thus demonstrated.

Example 4

A reactor was charged with monomers composed of 92.8% vinyl chloride, 1.9% ethyl hydroxyethyl fumarate and 5.3% isobutylene, all percentages being by weight, and polymerized at 90° C., for 12 minutes and a 3.8% conversion, employing 0.071% azobisisobutyronitrile (0.025 mol percent on monomers) and with methyl isobutyl ketone in an amount of 15 ml./47.5 grams monomer. The resulting interpolymer analyzed as 45.13% chlorine and 1.2% hydroxyl and had a content of 79.6% vinyl chloride, 12.6% ethyl hydroxyethyl fumarate and 7.4% isobutylene, all of the percentages being by weight. The interpolymer was of relatively low molecular weight, having a Gardner viscosity rating of Y as a 48% solids solution in 50:50 methyl isobutyl ketone/xylene. The polymer when baked on steel 15 minutes at 150° C., exhibited no failure in impact, bend and adhesion tests, and also strong resistance to an aqueous detergent. A polymer prepared under similar conditions with monomers composed of 91.7% vinyl chloride, 2.9% ethyl hydroxyethyl fumarate and 5.3% isobutylene, all of the percentages being by weight, had a viscosity of V on the Gardner scale in the same test solution and similarly exhibited no failure in impact, bend and adhesion tests. Coatings of greater hardness were obtained when 3% by weight of urea-formaldehyde resin sold under trademark "Resimene" U–920 was added prior to curing. In the foregoing polymerization, triethylamine was added along with the monomers in an amount sufficient to neutralize the acid content of the ethyl hydroxyethyl fumarate, a 0.002 gram amount being used per acidity unit expressed as mg. KOH/gram of the fumarate being employed. In this and other examples, unsubstituted fumarates, e.g., diethyl fumarate, can be substituted for the ethyl hydroxyethyl fumarate to obtain the corresponding terpolymer of similar properties except for those due to the hydroxyl group such as adhesion properties and suitability for cross-linking by various reagents. The dialkyl fumarates provide plasticization and the isobutylene contributes stability against dehydrohalogenation.

*Example 5*

A monomer charge composed of 92% vinyl chloride, 3% ethyl hydroxyethyl fumarate and 5% isobutylene, with triethylamine provided in amount stiochiometric to the acid in the fumarate, was polymerized in a 2.4 liter closed reactor (gauge pressure about 200 p.s.i.), at 90° C., for 10.5 minutes for a conversion of 5.1 based on total monomers. As initiator, 0.07 gram azobisisobutyronitrile per 100 grams monomers was employed and acetone was present in .3 ml./gram of monomers. The reactor contents was emptied into cold methanol and the polymer was separated and dried. The polymer was 74.3% vinyl chloride, 19.5% ethyl hydroxyethyl fumarate and 6.2% isobutylene. The polymer when baked on steel for 15 minutes at 150° C., exhibited good impact strength, bend, adhesion and hardness properties. Butyl hydroxyethyl fumarate can be substituted for the ethyl hydroxyethyl fumarate to give a polymer of similarly good properties.

While the advantages of the present invention are particularly notable in the case of the interpolymerizations of fumarates described in detail herein, particularly those of hydroxyalkylfumarates, it is also advantageous to employ amounts of amine stoichiometric to the acid content of fumarates in general, e.g., diethyl fumarate, for interpolymerizations with vinyl chloride.

What is claimed is:

1. The method of preparing interpolymers of vinyl chloride and a diester of fumaric acid in which one esterifying group is an hydroxy (oxa) hydrocarbyl group and the other esterifying group is selected from the group consisting of alkyl, aryl and hydroxy(oxa) hydrocarbyl groups and some fumarate with free carboxyl is present in said diester, which comprises polymerizing such monomers in the presence of an organic amine in amount sufficient to approximately neutralize the acid content of the diester by contacting such monomers with a free-radical catalyst.

2. The method of claim 1 in which the amine is employed in an amount of about 1 to 1.5 stoichiometric equivalents per equivalent of free acid in the diester of fumaric acid.

3. The method of claim 1 in which the amine was employed in approximately stoichiometrically equivalent amount to fumaric monoester present in the diester.

4. The method of claim 2 in which the amine is an alkyl amine.

5. The method of claim 2 in which the amine is a trialkyl amine.

6. The method of preparing interpolymers which comprises interpolymerizing vinyl chloride and alkyl hydroxyalkyl fumarate by contacting same with a free radical catalyst and employing a tertiary organic amine in the polymerization in an amount to neutralize monoalkyl fumarate which contains free carboxyl and some of which is present but in an amount less than 5% by weight of the fumarate monomer.

7. The method of interpolymerizing vinyl chloride, a diester of fumaric acid in which one esterifying group is an hydroxy (oxa) hydrocarbyl group and the other esterifying group is selected from the group consisting of alkyl, aryl and hydroxy(oxa) hydrocarbyl groups and some fumarate with free carboxyl is present in said diester, and isobutylene which comprises polymerizing same with a free-radical catalyst in the presence of an organic amine in an amount sufficient to approximately neutralize the acid content of the diester.

8. The method of claim 6 in which the fumarate monomer does not exceed 5% by weight of the monomers in the polymerization mixture, and the polymerization is conducted at about 50° to about 100° C.

9. The method of claim 7 in which vinyl chloride is present as the major part by weight of the monomer mixture and the fumarate does not constitute more than 5% by weight of the monomers in the polymerization mixture and the polymerization is conducted at about 50° to about 100° C.

10. The method of claim 2 in which the amine is triethylamine.

11. The method of claim 1 in which the diester is an hydroxyalkyl fumarate in which the alkyl of the hydroxyalkyl group is a lower alkyl.

12. The method of preparing interpolymers of vinyl chloride and a diester of fumaric acid in which one esterifying group is an hydroxyalkyl group and the other esterifying group is selected from the group consisting of alkyl and hydroxyalkyl groups and some fumarate with free carboxyl is present in said diester which comprises polymerizing such monomers by contacting same with a free-radical catalyst in the presence of an organic amine in an amount sufficient to approximately neutralize the acid content of the diester.

References Cited by the Examiner

UNITED STATES PATENTS 3,159,610   12/1964   Slocombe et al. _____ 260—89.5

JOSEPH L. SCHOFER, *Primary Examiner.*

L. WOLF, *Assistant Examiner.*